(12) United States Patent
Brink et al.

(10) Patent No.: US 12,263,657 B2
(45) Date of Patent: Apr. 1, 2025

(54) METHOD FOR ASSEMBLING A WIND TURBINE BLADE, WIND TURBINE BLADE CLEAT FOR ASSEMBLING A WIND TURBINE BLADE SHELL AND CLAMP TOOL FOR CLAMPING A SEPARATELY MANUFACTURED GLUE FLANGE DURING ASSEMBLY OF A WIND TURBINE BLADE

(71) Applicants: LM WIND POWER A/S, Kolding (DK); LM WIND POWER R&D (HOLLAND) B.V., Heerhugowaard (NL); LM WIND POWER BLADES (INDIA) PRIVATE LIMITED, Bengaluru (IN)

(72) Inventors: Morten Bak Brink, Kolding (DK); Alex Berkel, Kolding (DK); Pavel Zhuravlov, Heerhugowaard (NL); Sheetu Sharma, Karnataka (IN); Pragneshbhai Vijay Kumar Pujari, Karnataka (IN)

(73) Assignees: LM WIND POWER A/S, Kolding (DK); LM WIND POWER R&D (HOLLAND) B.V., Heerhugowaard (NL); LM WIND POWER BLADES (INDIA) PRIVATE LIMITED, Bengaluru (IN)

( * ) Notice: Subject to any disclaimer, the term of this patent is extended or adjusted under 35 U.S.C. 154(b) by 90 days.

(21) Appl. No.: 17/928,899

(22) PCT Filed: Apr. 13, 2021

(86) PCT No.: PCT/EP2021/059543
§ 371 (c)(1),
(2) Date: Nov. 30, 2022

(87) PCT Pub. No.: WO2021/244797
PCT Pub. Date: Dec. 9, 2021

(65) Prior Publication Data

US 2023/0241852 A1   Aug. 3, 2023

(30) Foreign Application Priority Data

Jun. 1, 2020  (IN) .............................. 202041022833
Sep. 1, 2020  (GB) ..................................... 2013679

(51) Int. Cl.
*B29D 99/00*  (2010.01)
*B29C 65/00*  (2006.01)
(Continued)

(52) U.S. Cl.
CPC .......... *B29D 99/0028* (2013.01); *B29C 65/52* (2013.01); *B29C 66/1122* (2013.01);
(Continued)

(58) Field of Classification Search
CPC . B29D 99/0028; B29C 65/52; B29C 66/1122; B29C 66/1142; B29C 66/54;
(Continued)

(56) References Cited

U.S. PATENT DOCUMENTS 11,433,632 B2 * 9/2022 Thomsen .............. B29C 66/636
11,813,778 B2 * 11/2023 With Møller et al. .. B29C 33/26
(Continued)

FOREIGN PATENT DOCUMENTS

CN     106624894 A    5/2017
CN     106738500 A    5/2017
(Continued)

*Primary Examiner* — Sang K Kim
(74) *Attorney, Agent, or Firm* — Nath, Goldberg & Meyer; Jerald L. Meyer; Tanya E. Harkins

(57) ABSTRACT

A method for assembling an integrated wind turbine blade shell, comprising:
   attaching and distributing cleats onto the first wind turbine shell part at a distance from the first edge of a first wind
(Continued)

turbine blade part, wherein a ledge surface and a rail of each cleat define, together with the interior surface, a ledge for supporting a glue flange;

securing a clamp tool to the anchor of each cleat;

resting the separately manufactured glue flange on the ledge surface of each cleat;

closing the first and second wind turbine blade shell parts;

actuate the clamp tools to clamp the glue flange between the clamp head of each clamp tool and interior surface; and detaching and removing the clamp tools from the cleats.

12 Claims, 8 Drawing Sheets

(51) Int. Cl.
*B29C 65/52* (2006.01)
*F03D 1/06* (2006.01)
*B29L 31/08* (2006.01)

(52) U.S. Cl.
CPC .......... *B29C 66/1142* (2013.01); *B29C 66/54* (2013.01); *B29C 66/721* (2013.01); *B29C 66/73756* (2013.01); *F03D 1/0675* (2013.01); *B29L 2031/085* (2013.01); *F05B 2230/23* (2013.01); *F05B 2240/302* (2013.01); *F05B 2260/30* (2013.01); *F05B 2280/702* (2013.01)

(58) Field of Classification Search
CPC ............. B29C 66/721; B29C 66/73756; B29L 2031/085; F03D 1/0675; F05B 2230/23; F05B 2240/302; F05B 2260/30; F05B 2280/702

See application file for complete search history.

(56) References Cited

U.S. PATENT DOCUMENTS

| 2010/0126115 | A1 | 5/2010 | Lim et al. |
| 2011/0262280 | A1 | 10/2011 | Schubert |
| 2022/0314568 | A1* | 10/2022 | Mukherjee .......... B29C 65/7876 |
| 2022/0402171 | A1* | 12/2022 | Møller ...................... F16B 2/10 |

FOREIGN PATENT DOCUMENTS

| CN | 108582817 A | 9/2018 |
| CN | 209666323 U | 11/2019 |
| CN | 209851632 U | 12/2019 |
| EP | 3025836 A1 | 6/2016 |
| WO | 2009/109619 A2 | 9/2009 |
| WO | 2012/159718 A2 | 11/2012 |
| WO | 2014/108507 A1 | 7/2014 |
| WO | 2017/220596 A1 | 12/2017 |
| WO | 2018/224104 A1 | 12/2018 |

\* cited by examiner

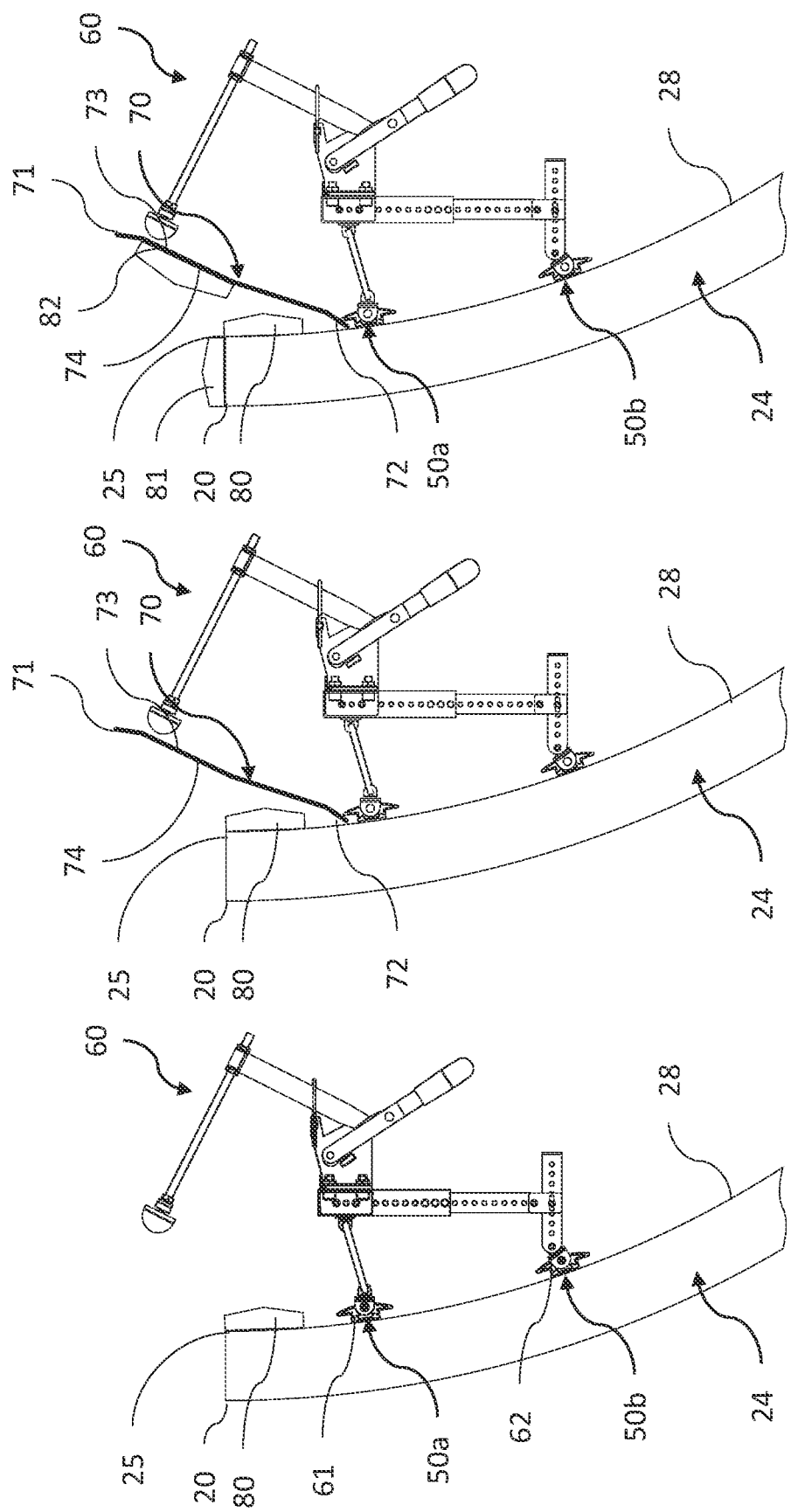

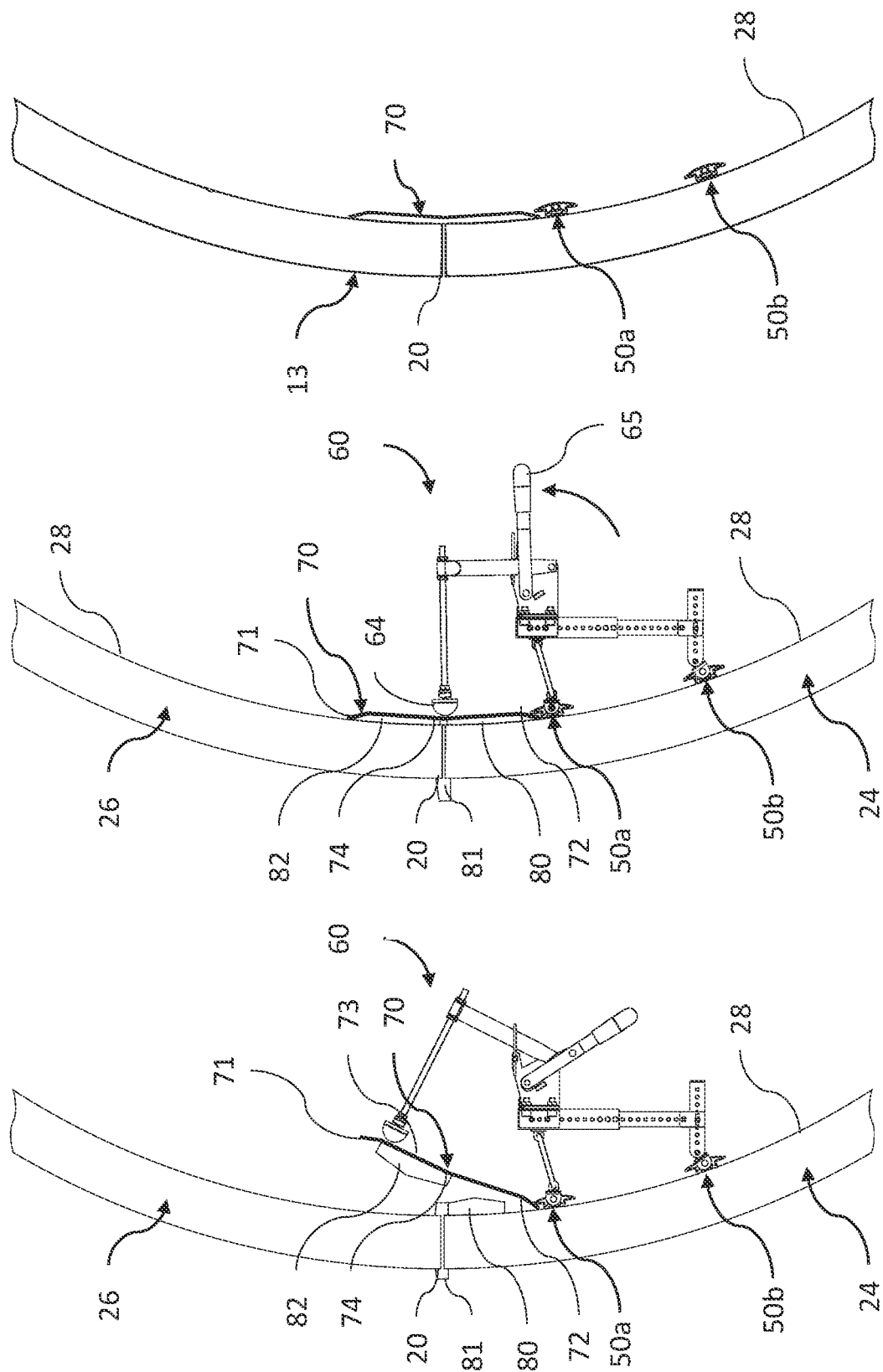

METHOD FOR ASSEMBLING A WIND TURBINE BLADE, WIND TURBINE BLADE CLEAT FOR ASSEMBLING A WIND TURBINE BLADE SHELL AND CLAMP TOOL FOR CLAMPING A SEPARATELY MANUFACTURED GLUE FLANGE DURING ASSEMBLY OF A WIND TURBINE BLADE

This is a National Phase Application filed under 35 U.S.C. 371 as a national stage of PCT/EP2021/059543, filed Apr. 13, 2021, an application claiming the benefit of Indian Application No. 202041022833, filed Jun. 1, 2020 and Great Britain Application No. 2013679.2, filed Sep. 1, 2020, the content of each of which is hereby incorporated by reference in its entirety.

TECHNICAL FIELD

The present disclosure relates to a method for assembling a wind turbine blade, and a cleat and a clamp tool for using in such a method.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more wind turbine blades. The wind turbine blades capture kinetic energy of wind using known airfoil principles. The wind turbine blades transmit the kinetic energy in the form of rotational energy so as to turn a shaft coupling the wind turbine blades to a gearbox, or if a gearbox is not used, directly to the generator. The generator then converts the mechanical energy to electrical energy that may be deployed to a utility grid.

Wind turbine blades have become increasingly longer over the years and may today have a length of 80 metres or more and may weigh tens of tons. The wind turbine blades are typically moulded as two separate shell halves, i.e. a pressure side shell half, which is also known as an upwind shell half, and a suction side shell half, which is also known as a downwind shell half, in respective blade half shell moulds. The downwind shell half typically has a trailing edge glue flange and a leading edge glue flange both extending along the longitudinal extent of the respective blade shell half. The leading edge glue flange and the trailing edge glue flange is a composite, conventionally co-infused and integrated with the downwind shell half. After applying adhesive to the leading edge glue flange and trailing edge glue flange and configuring the load-bearing portions of the blade shell, several turning hinges turn the upwind blade shell half over onto the downwind blade shell half. An example of such turning hinges is shown in WO 2016/083504. The adhesive then hardens and joins the shell halves to form the complete aerodynamic blade shell.

The trailing edge glue flange has a rather complex geometry as the curvature of the trailing edge glue flange cross-section changes along the extent of the glue flange from being approximately flat in the root region to being approximately U-shaped in the tip region. This leads to a number of drawbacks of the integrated trailing edge glue flange. For instance, the trailing edge glue flange may warp due to shrinkage of polyester resin.

This has led to the use of a separate trailing edge glue flange manufactured separately from the blade shell half. While alleviating some of the above drawbacks of the co-infused glue flange, a separate trailing edge glue flange has other drawbacks. Such a separate trailing edge glue flange is a thin and rather flexible component which is challenging to correctly position on the downwind blade shell half. Additionally, it is difficult to keep the trailing edge glue flange in the correct position during the closing of the blade moulds and apply sufficient pressure during the subsequent bonding of the blade shell halves along the trailing edge as the trailing edge glue flange cannot be held from the exterior of the blade mould.

SUMMARY

On this background, it may be seen as an object of the present disclosure to provide a method of assembling a wind turbine blade shell which at least alleviate some of the described drawbacks.

One or more of these objects may be met by aspects of the present disclosure as described in the following.

A first aspect of this disclosure relates to a method for assembling an integrated wind turbine blade shell, the method comprising the steps of:
providing:
  a first and a second, optionally pre-infused, pre-consolidated, pre-cured or pre-manufactured, wind turbine shell part each extending along a longitudinal direction and each having an interior surface configured for facing the interior of the wind turbine blade, the first wind turbine blade shell part comprising a first edge and the second wind turbine blade shell part comprising a second edge,
  a glue flange extending along the longitudinal direction and having an upper edge, a lower edge, an interior surface configured for facing the interior of the wind turbine blade, and an exterior surface configured for facing the exterior of the wind turbine blade,
  a plurality of wind turbine blade cleats each including a base surface, an anchor positioned at a distance from the base surface, a ledge surface extending transversely to the base surface, and a rail protruding from the ledge surface, and
  a plurality of clamp tools each including a clamp head and an actuator configured for actuating the clamp head between an open position and a clamping position, optionally each clamp tool of the plurality of clamp tools being configured for being handheld;
attaching, preferably adhering, the plurality of wind turbine blade cleats including first cleats onto the interior surface of the first wind turbine blade shell part, the first cleats being positioned at a distance from the first edge of the first wind turbine blade part and being distributed, optionally equidistantly, along the longitudinal direction, preferably from the root region to the tip region of the wind turbine blade shell part, wherein the ledge surface and the rail of each first cleat defines, together with the interior surface of the first wind turbine blade shell part, a ledge for supporting the glue flange;
optionally applying a first adhesive on the interior surface of the first wind turbine shell part adjacent to the first edge or to the exterior surface of the glue flange adjacent to the lower edge of the glue flange;
securing a, preferably each, clamp tool of the plurality of clamp tools to the anchor of each first or corresponding cleat preferably of the plurality of attached cleats, such as the corresponding first cleat or another cleat adjacent to the corresponding first cleat;

resting the lower edge of the glue flange on the ledge surface of each first cleat, and optionally leaning the glue flange against the clamp heads of the plurality of clamp tools, so that the upper edge of the glue flange extends above the first edge of the first wind turbine blade shell part;

optionally applying a second adhesive on the exterior surface of the glue flange or on the interior surface of the second wind turbine shell part adjacent to the second edge;

optionally adjusting the clamp in a plane comprising the glue flange, the respective first cleat, and the clamp head so that, in the clamping position, the clamp head engages the glue flange substantially at the first edge of the first wind turbine blade shell part;

closing the first and second wind turbine blade shell parts by bringing the first edge of the first wind turbine blade shell part and the second edge of the second wind turbine blade shell part together;

actuate the plurality of clamp tools to clamp the glue flange between the clamp head of each clamp tool and interior surface of the first and second wind turbine blade shell parts so that a/the first adhesive contacts the exterior surface of the glue flange and the interior surface of the first wind turbine blade shell part and so that a/the second adhesive contacts the exterior surface of the glue flange and the interior surface of the second wind turbine blade shell part;

causing or letting the first adhesive and second adhesive harden to integrate the first wind turbine blade shell part and second wind turbine blade shell part via the glue flange so as to assemble the integrated wind turbine blade shell; and optionally detaching and removing the plurality of clamp tools from the plurality of cleats.

Such a method may avoid the drawbacks of an integrated glue flange, in particular any post-moulding repairs of the glue flange can be avoided since the glue flange can easily be replaced if damaged during handling. Additionally, it is easy to securely hold the glue flange in place during assembly since the cleat and clamp tool are easily and quickly actuated.

Additionally or alternatively, the method may further comprise attaching, preferably adhering, second cleats of the plurality of wind turbine blade cleats onto the interior surface of the first wind turbine shell part, each second cleat being positioned adjacent to a first cleat to form a cleat pair, preferably in a plane perpendicular to the longitudinal direction, and wherein each clamp tool is attached to a corresponding cleat pair.

Additionally or alternatively, the second cleat of each cleat pair may be positioned further from the first edge than the respective first cleat.

Additionally or alternatively, the step of attaching the clamp tool to the corresponding cleat, optionally the first cleat, and optionally further to the corresponding second cleat, is/are performed by inserting an end of a detachable pin through a hole of each anchor and securing the pin to each corresponding cleat, optionally by inserting a detachable locking member through the end of the pin protruding from the cleat.

A second aspect of this disclosure relates to a wind turbine blade cleat for assembling a wind turbine blade shell, the wind turbine blade cleat extending along a longitudinal direction configured to be arranged parallel to a longitudinal direction of the wind turbine blade shell, the wind turbine blade cleat comprising:

a base including a base surface configured for being attached, preferably adhered, to an interior surface of a wind turbine blade shell, an anchor positioned at a distance from the base surface and configured for attaching a clamp tool to the interior surface of the wind turbine blade shell via the attached, preferably adhered, base surface, a ledge surface extending transversely, preferably perpendicularly, to the base surface, and a rail protruding, preferably upright, from the ledge surface, wherein, when the base surface of the wind turbine blade cleat is attached to the interior surface of the wind turbine blade shell, the ledge surface and the rail define a ledge extending along the longitudinal direction, the ledge being able to receive and support a lower edge of a separate, upright glue flange for being attached to the wind turbine blade shell.

Additionally or alternatively, the anchor may comprise a hole extending along the longitudinal direction and being configured for receiving an attachment pin of a clamp tool.

Additionally or alternatively, the cleat may comprise one or more ribs separating the anchor from the base. This may provide a lightweight cleat while ensuring sufficient stiffness to support the clamp tool.

Additionally or alternatively, the wind turbine blade cleat may be manufactured by an extrusion process, additive manufacturing, or injection moulding.

Additionally or alternatively, cross-sections of the wind turbine blade cleat along the longitudinal direction are constant. This may be advantageous for manufacturing the cleat as the cleat can be made using extrusion, additive manufacturing, or injection moulding.

Additionally or alternatively, the cleat may further comprise a head with a convexly curved head surface being positioned opposite of the base surface relative to the anchor, and preferably being configured for facing the interior of the wind turbine blade. Such a convexly curved surface facing the interior of the wind turbine blade improves the safety of any operators tightly passing by the cleat in the confined interior space of the wind turbine blade.

Additionally or alternatively, the cleat may be mirror symmetrical in a mirror plane comprising the longitudinal direction. This may facilitate installation of the cleats, as the risk of the cleat being wrongly oriented is reduced.

A third aspect of this disclosure relates to the use of a cleat according to the second aspect for assembling a wind turbine blade.

A fourth aspect of this disclosure relates to a wind turbine blade comprising a cleat according to the second aspect of this disclosure or a plurality of cleats according to the second aspect of this disclosure, optionally attached, preferably adhered, to an interior surface of the wind turbine blade.

Additionally or alternatively, the wind turbine blade may comprise a first and a second wind turbine blade shell part each having an interior surface facing the interior of the wind turbine blade and each being a first composite structure including a first fibre-reinforcement material embedded in a first polymer matrix, the cleat being attached to the interior surface of the first wind turbine blade shell part.

Additionally or alternatively, the wind turbine blade may further comprise a glue flange being a second composite structure including a second fibre-reinforcement material embedded in a second polymer matrix, wherein the glue flange is separately manufactured relative to the first and second wind turbine blade shell parts, and wherein the glue flange connects the interior surface of the first wind turbine blade shell part with the interior surface of the second wind turbine blade shell part, preferably via an adhesive different from both of the first and second polymer matrices, optionally the glue flange being positioned at the cleat and preferably a lower edge of the glue flange is retained by the rail of the cleat.

A fifth aspect of this disclosure relates to a clamp tool for clamping a separately manufactured glue flange during assembly of a wind turbine blade, the clamp tool comprising:

- a first foot configured for being secured to an interior surface of a wind turbine blade shell part preferably via a detachable attachment to an anchor of a first wind turbine blade cleat,
- optionally a second foot configured for being secured to an interior surface of a wind turbine blade shell part preferably via a detachable attachment to an anchor of a second wind turbine blade cleat,
- an arm with a clamp head configured for engaging the glue flange and movable between an open position and a clamping position, preferably by being rotated about a clamping axis, optionally the open position and clamping position are two extreme positions of the range of motion of the clamp head, and
- an actuator configured for being actuated, preferably by an operator, to move the clamp head between the open position and the clamping position.

Additionally or alternatively, the clamp tool may further comprise:

- a first adjustment member configured for adjusting the clamping position of the clamp head in a first direction, the first direction being perpendicular to the longitudinal direction and preferably horizontal, optionally the first adjustment member comprising a first end attached to the second foot, and/or
- a second adjustment member configured for adjusting, preferably telescopically, the clamping position of the clamp head in a second direction, the second direction being perpendicular to the longitudinal direction and preferably perpendicular to the first direction and more preferably vertical, optionally the second adjustment member comprising a first end attached to the first adjustment member, and/or
- a third adjustment member configured for adjusting an angle of the arm in the clamping position about an adjustment axis being different from the clamping axis, optionally the third adjustment member comprising a first end attached to the first foot and/or a second end attached to the second adjustment member.

Additionally or alternatively, the clamp tool may further comprise a stop configured for preventing the arm from being moved or rotated further away from the clamping position when in the open position.

Additionally or alternatively, the clamp head may comprise a resilient material configured for being deformed upon contact with a glue flange in the clamping position.

A sixth aspect of this disclosure relates to a use of a clamp tool according to the fifth aspect of this disclosure for assembly of a wind turbine blade.

A seventh aspect of this disclosure relates to a kit of tool parts comprising a first cleat according to the second aspect and a clamp tool according to the fifth aspect.

Additionally or alternatively, the kit of tool parts may comprise a second cleat being identical to the first cleat, wherein the second foot of the clamp tool may be configured for being attached to the anchor of the second cleat.

An eighth aspect of this disclosure relates to a use of a kit of tool parts according to the seventh aspect of this disclosure for assembly of a wind turbine blade.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of the present disclosure will be described in more detail in the following with regard to the accompanying figures. Like reference numerals refer to like elements throughout. Like elements may, thus, not be described in detail with respect to the description of each figure. The figures show one way of implementing embodiments of the present disclosure and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIGS. 4a-4c, 6a-6c, and 7a-7c are schematic diagrams illustrating a cross-sectional view of a wind turbine blade shell part during different method steps.

DETAILED DESCRIPTION

In the following figure description, the same reference numbers refer to the same elements and may thus not be described in relation to all figures.

Figure 1:
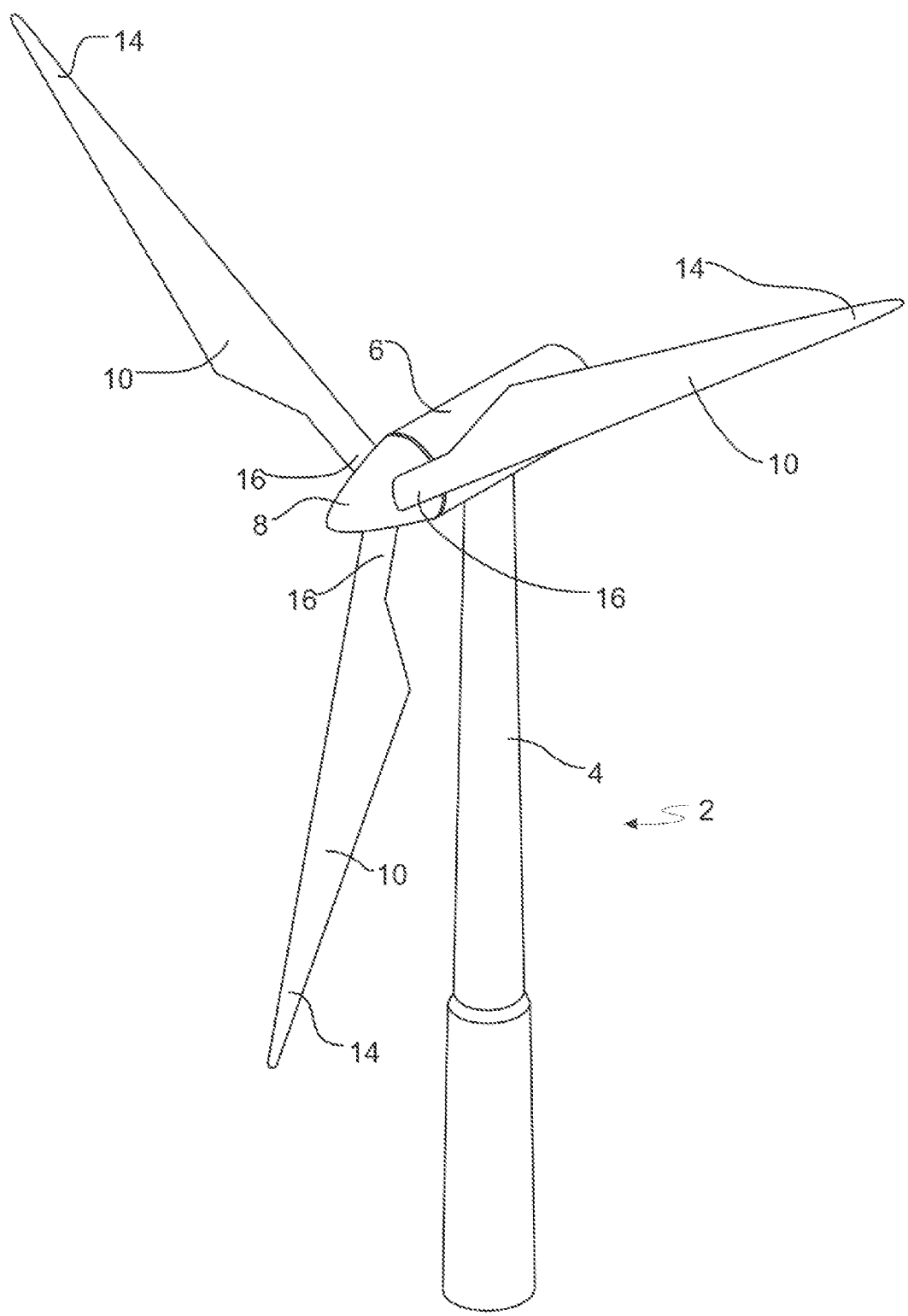
FIG. 1 is a schematic diagram illustrating a perspective view of an exemplary wind turbine.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

Figure 2:
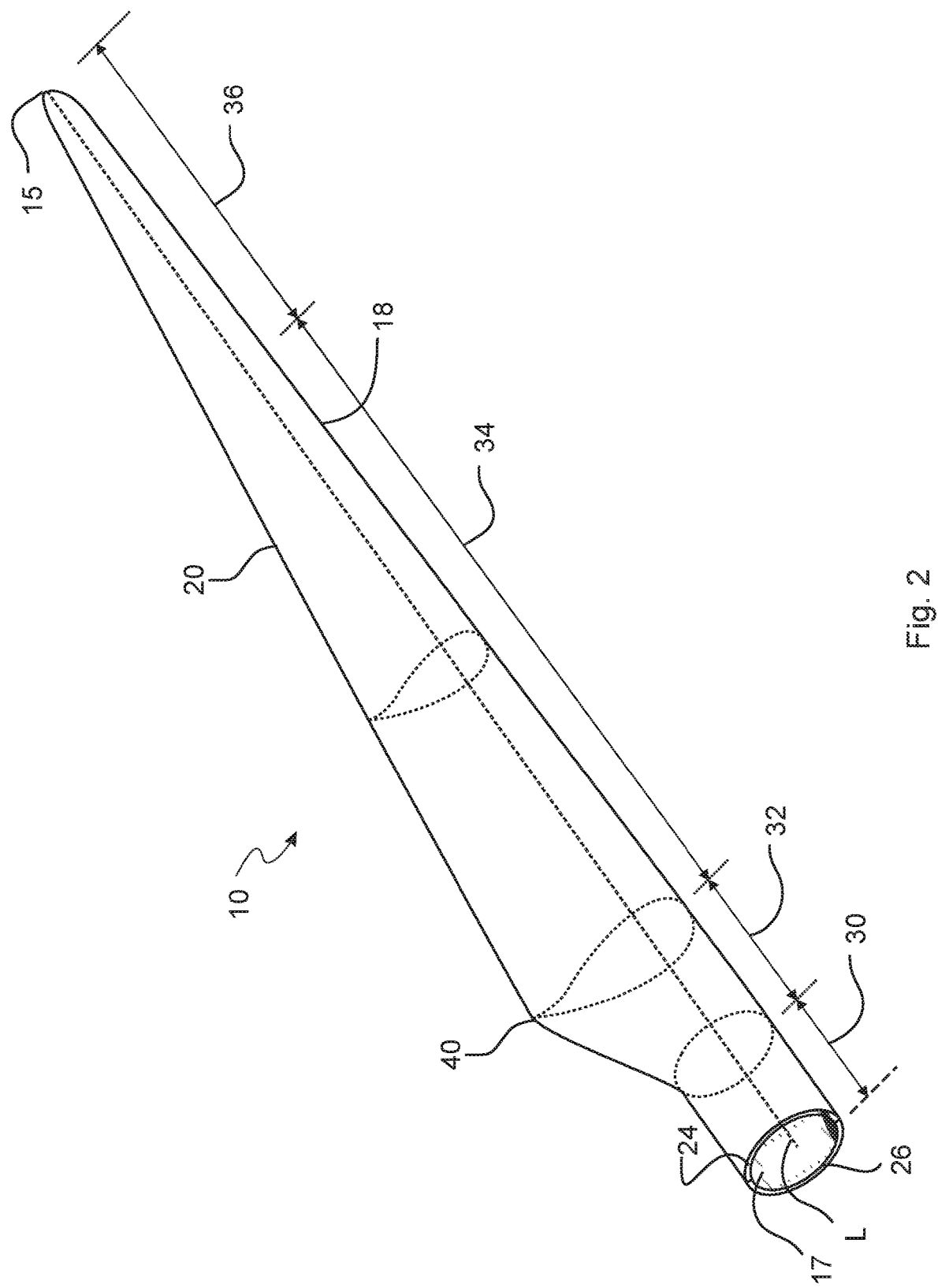
FIG. 2 is a schematic diagram illustrating a perspective view of an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 including a tip region 36 furthest away from the hub and a transition region 32 between the root region 30 and the airfoil region 34. The blade 10 comprises a leading edge 18 facing the direction of rotation of the blade 10, when the blade is mounted on the hub 8, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing distance from the hub. The airfoil region 34 has an airfoil profile with a chord extending between the leading edge 18 and the trailing edge 20 of the blade 10. The width of the chord decreases with increasing distance from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer.

The wind turbine blade 10 may comprise additional shell parts, such as a third shell part and/or a fourth shell part. The first blade shell part 24 is a suction side or downwind blade shell part. The second blade shell part 26 is a pressure side or upwind blade shell part. The first blade shell part 24 and the second blade shell part 26 are fastened together with adhesive, such as glue, along bond lines or glue joints extending along the trailing edge 20 and the leading edge 18 of the blade 10 typically via a glue flange.

A method for attaching the blade shell parts 24, 26 using a glue flange, cleats, and clamp tools according to this disclosure is described in the following.

Figure 3A:
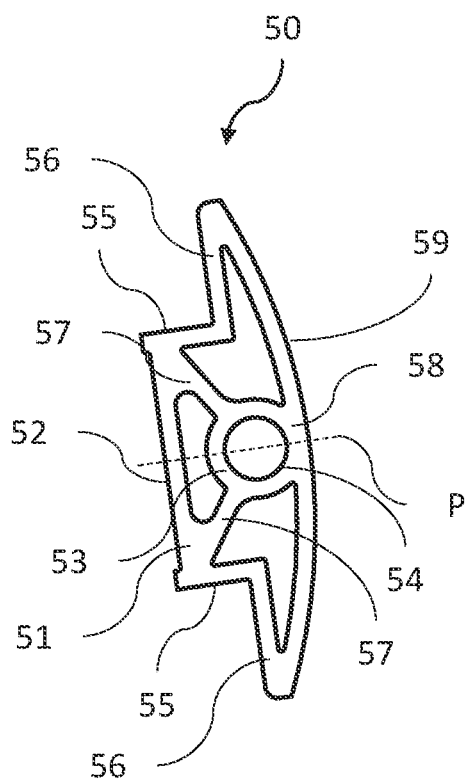
FIGS. 3a-3b are schematic diagrams illustrating a cross-sectional view and a perspective view, respectively, of an exemplary cleat.
Figure 3B:
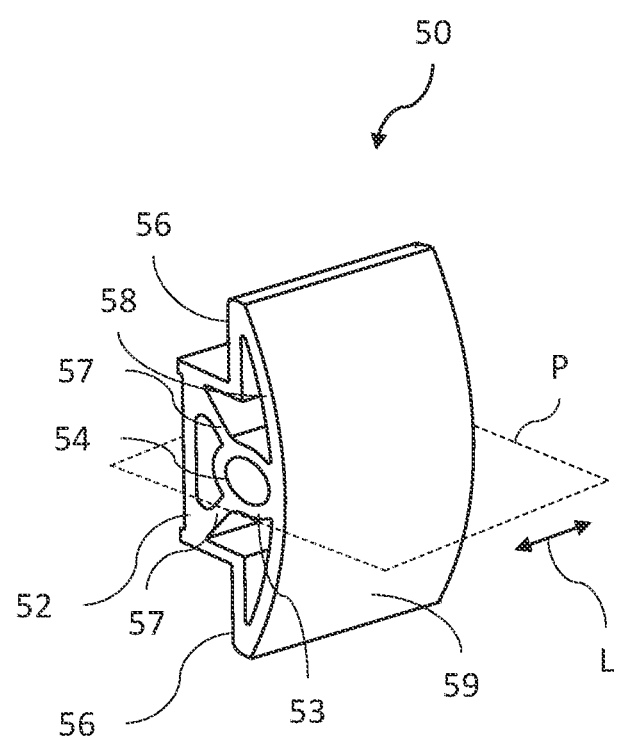

Turning to FIGS. 3a-3b, a wind turbine blade cleat 50 is shown. The cleat 50 is an extruded part, but could also be injection moulded, with a constant T-shaped cross-section in a longitudinal direction $L_{cleat}$. The cleat 50 is intended to be oriented so that the longitudinal direction $L_{cleat}$ of the cleat 50 is in parallel with the longitudinal direction L of the wind turbine blade 10 as shown in FIG. 2. The cleat 50 comprises a base 51, an anchor 53, two ribs 57, two ledge surfaces 55, two rails 56, and a head 58. The base 51 includes a base surface 52 configured for being mounted by adhesion to an interior surface of a wind turbine blade shell. The anchor 53 is positioned at a distance from the base surface 52 and includes a hole 54 for receiving an attachment pin of a clamp tool thereby attaching the clamp tool to the interior surface of the wind turbine blade shell via the adhered base surface 52. The clamp tool is described in greater detail below in connection with FIG. 3c. The two ribs 57 connect the anchor 53 with the base 51 and provides a good load transfer between the anchor 53 and the base 51. The ledge surface 55 extends perpendicularly to the base surface 52.

The rail 56 protrudes upright from the ledge surface 55. The cleat 50 is mirror symmetrical in a central mirror plane P perpendicular to the base surface 52 and thus the two ribs 57, two ledge surfaces 55, and two rails 56 are mirror symmetric in the mirror plane P. The head 58 has a head surface 59 positioned opposite of the base surface 52 relative to the anchor 53 and thus is intended to face the interior of the wind turbine blade 10. The head surface 59 is convexly curved to provide a safe surface for workers passing the cleat 50.

Figure 3C:
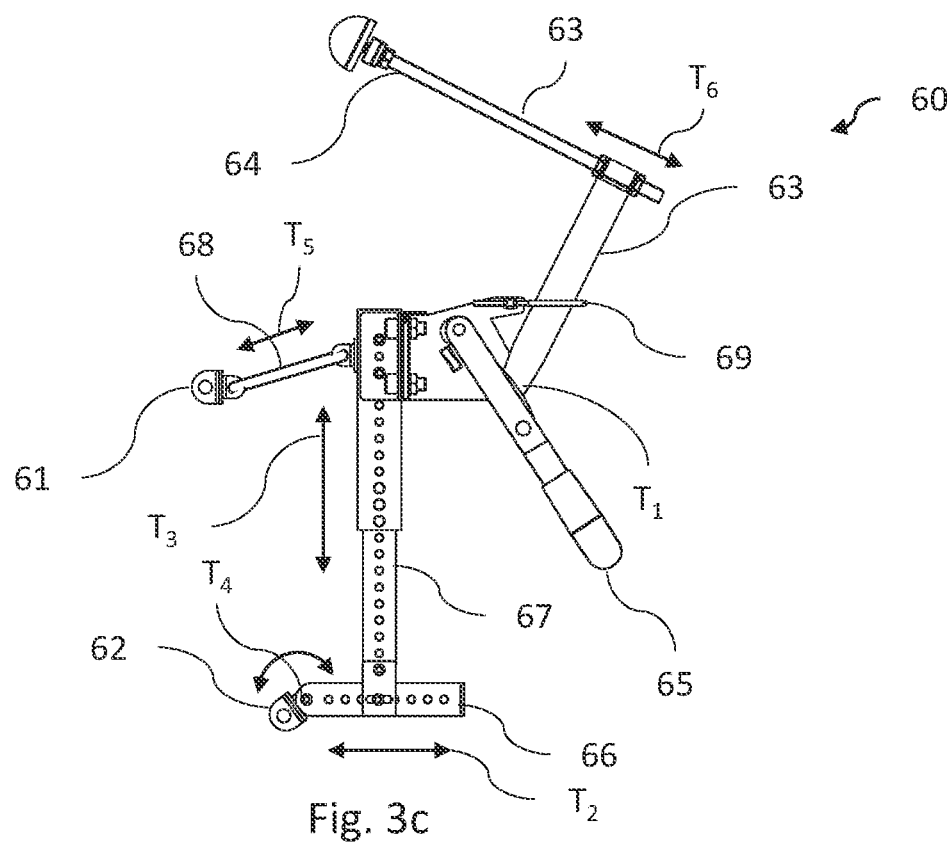
FIG. 3c is a schematic diagram illustrating a side view of an exemplary clamp tool.
Figure 8A:
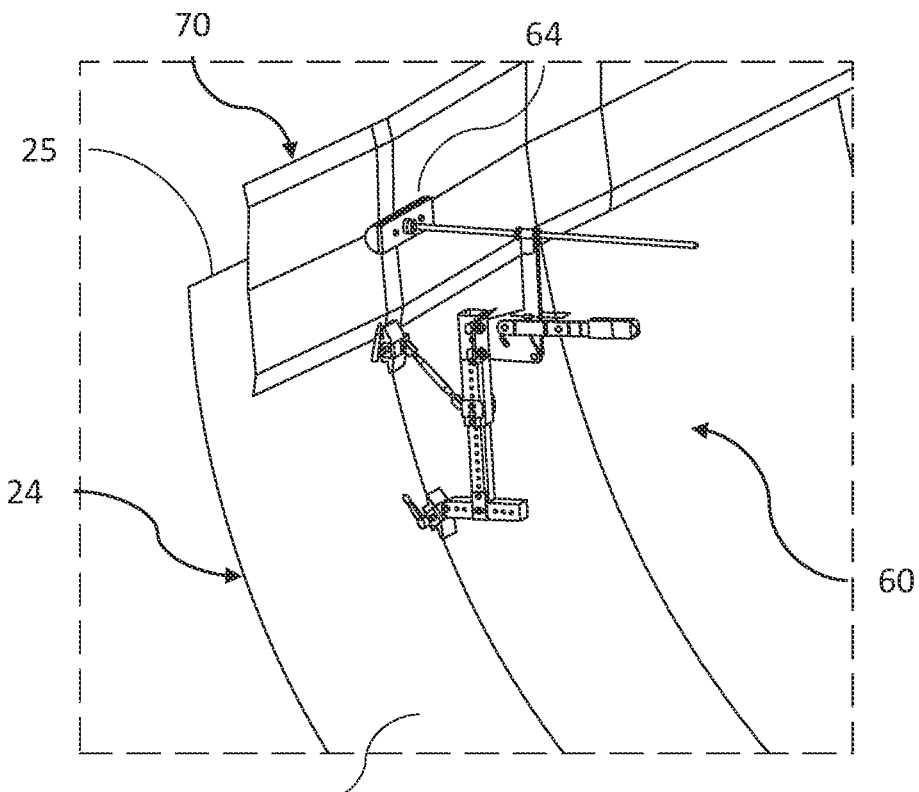
FIG. 8a is a schematic diagram illustrating a perspective view of a single clamp tool clamping a glue flange.
Figure 8B:
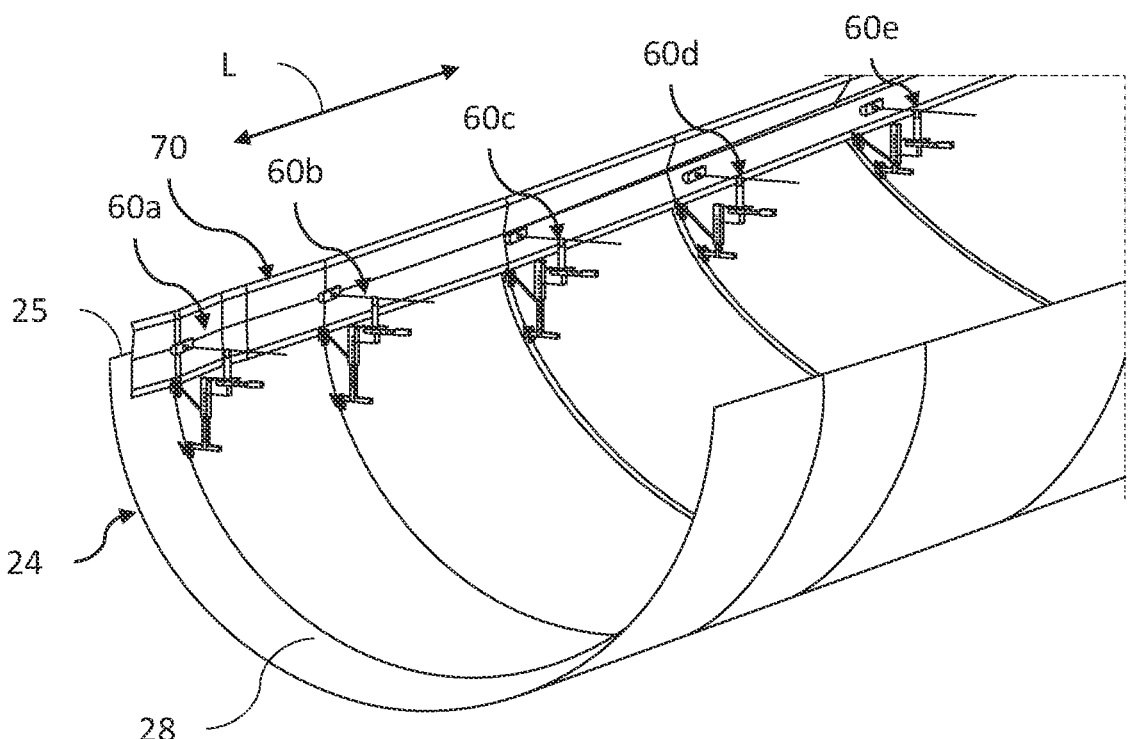
FIG. 8b is a schematic diagram illustrating a perspective view of a plurality of the clamp tool of FIG. 8a clamping a glue flange.

Turning now to FIG. 3c, the clamp tool 60 is shown and is used with the cleat 50 shown in FIGS. 3a-3b. The clamp tool 60 comprises a first foot 61, a second foot 62, an arm 63, an actuator 65, a first adjustment member 66, a second adjustment member 67, a third adjustment member 68, and a stop 69. The first and second feet 61, 62 each comprises a hole which an operator holding the clamp tool 60 can align with the hole of the anchor of a cleat 50 mounted on the wind turbine blade shell part. The operator can then insert a detachable pin (not shown) therethrough to secure each feet 61, 62 of the clamp tool 60 to a mounted cleat 50 and thereby to an interior surface of a wind turbine blade shell part. The arm 63 includes a clamp head 64 of a resilient material. The actuator 65 is a lever that can be actuated by an operator and thereby rotate the arm 63 with the clamp head 64 in an arc about the clamping axis $T_1$ between the open position as shown in FIG. 3c and the clamping position as shown in FIGS. 7b and 8a. The radius of the arc can be adjusted by screwing a screw connection at an elbow of the arm 63 thereby allowing a translational movement of the clamp head 64 in a clamping direction $T_6$ as shown in FIG. 3c. The first adjustment member 66 comprises a horizontal holed bar attached at one end to the second foot 62 and a bracket bolted to the horizontal holed bar. The bracket can be moved horizontally along the horizontal holed metal bar in the first horizontal adjustment direction $T_2$. The second adjustment member 67 comprises two telescopic holed vertical bars connected via a bolt connection. The bolt connection can be detached, and the vertical bars can then be moved telescopically and in a second, vertical adjustment direction $T_3$ before the bolt connection being reattached to secure the second adjustment member 67. The third adjustment member 68 is a telescopic bar comprising the first foot 61 at one end and a connection to the second adjustment member 67 at the other end. By telescopically adjusting the third adjustment member 68 along its extent in a telescopic adjustment direction $T_5$, the clamp tool 60 rotates about an adjustment rotational axis $T_4$ at the second foot 62. An operator can thus adjust the clamp tool 60 so that the clamp head provides the desired clamping force at the desired level in the clamping position as shown in FIGS. 7b and 8a. FIG. 8b shows five various configurations of the clamp tool 60a, 60b, 60c, 60d, 60e in order to accommodate the changing shape of the wind turbine blade 10 along the longitudinal direction L. The stop 69 catches the arm 63 and prevents it from being rotated further away about the clamping axis $T_1$ from the clamping position when in the open position as seen in FIG. 3a.

Figure 4C:
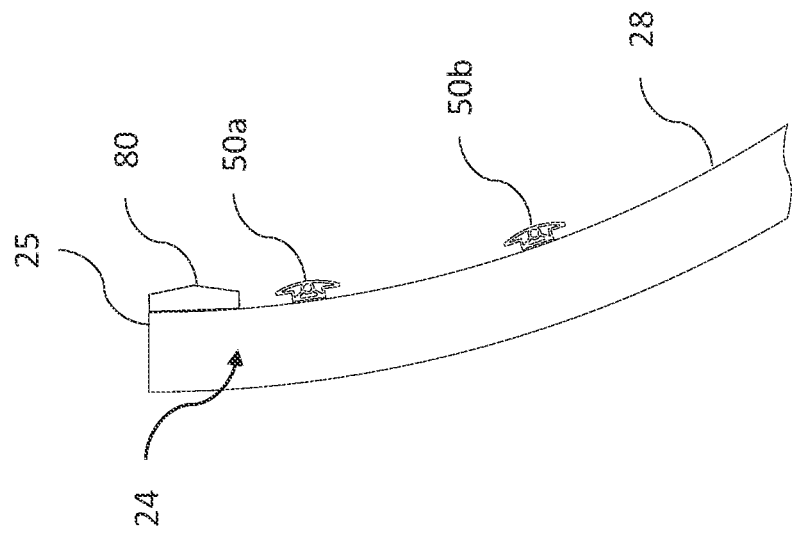
Figure 4B:
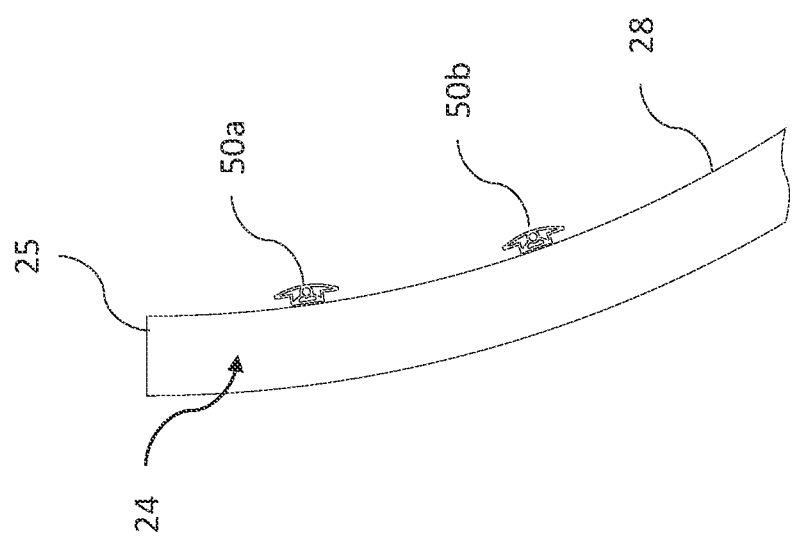
Figure 4A:
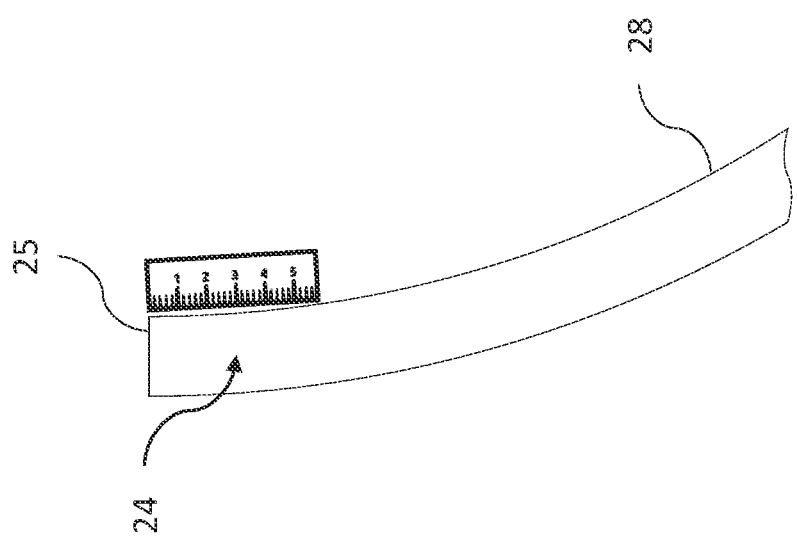

An exemplary method of attaching the blade shell parts 24, 26 to each other is shown in FIGS. 4a-7c. The blade shell parts 24, 26 are pre-cured and separately manufactured first composite structures including a first fibre-reinforcement material embedded in a first polymer matrix. As shown in FIG. 4a, a first blade shell part 24, which in this case is a downwind blade shell part, is provided and comprises an interior surface 28 intended to face the interior of the assembled wind turbine blade 10 and a first edge 25 intended to be adjacent to the trailing edge 20 of the assembled wind turbine blade. Then the position of a first cleat is measured from the first edge 25.

Next, as shown in FIG. 4b, a first cleat 50a of the type described in connection with FIGS. 3a-3b is adhered to the interior surface 28 at the previously measured position. Then a second cleat 50b of the same type is adhered at a sufficient distance to the first cleat 50a further away from the first edge 25. Such a first cleat 50a and second cleat 50b is referred to as a cleat pair. A number of cleat pairs 50a, 50b are distributed along the longitudinal direction L with about 1 metre spacing from the root region 30 and along the airfoil region 34.

Figure 5:
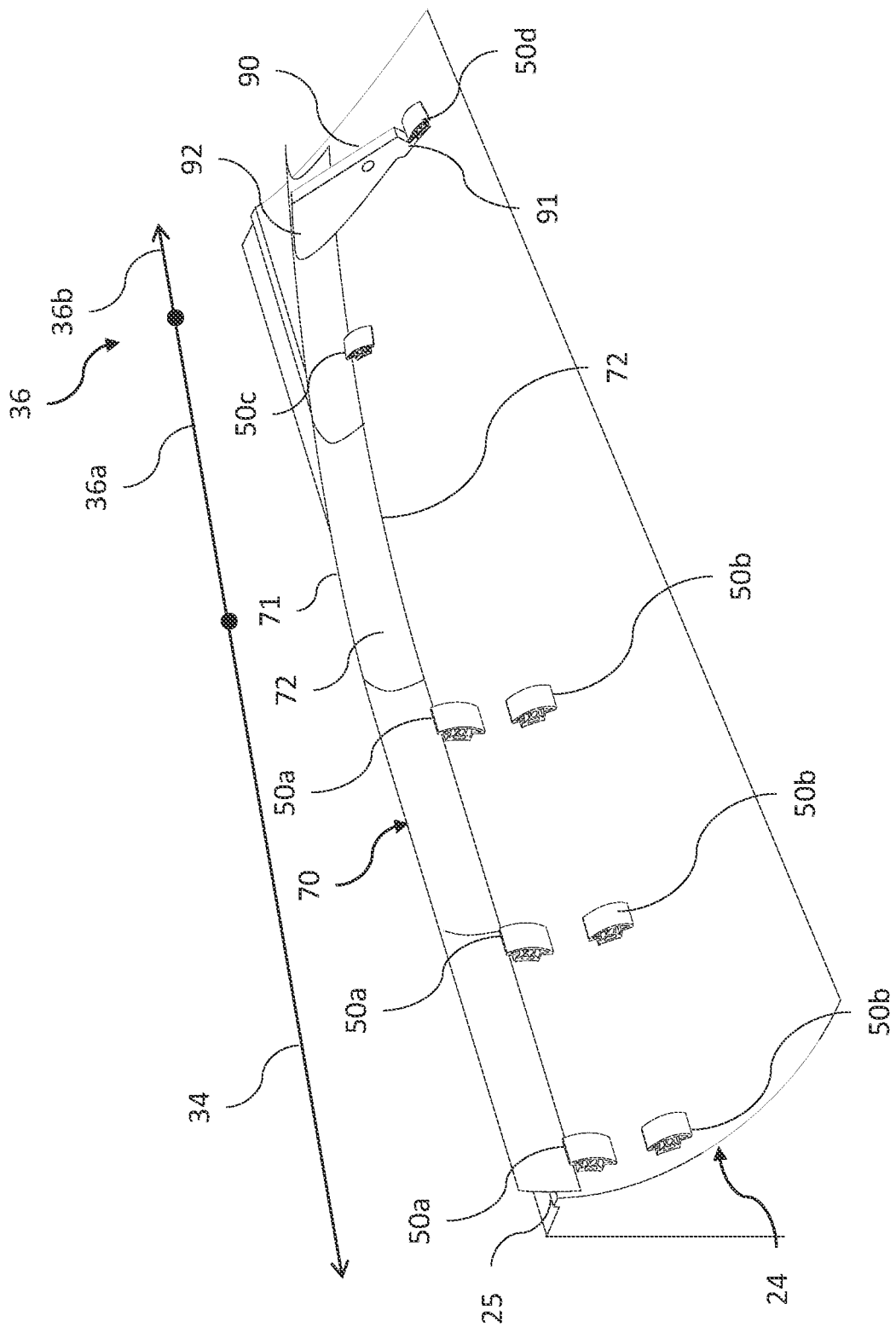
FIG. 5 is a schematic perspective diagram illustrating a perspective view of a plurality of cleats attached to a tip region of a wind turbine blade shell part.

As shown in FIG. 5, the ledge surface 55 of each first cleat 50a can support the glue flange 70 in the airfoil region 34 but clamp tools are required to securely rest the glue flange 70 on the cleats. Towards the tip region 36, the wind turbine blade is thinning and the trailing edge 20 becomes increasingly acute. In a first portion of the tip region 36 adjacent to the airfoil region 34, a single third cleat 50c is positioned and can support the glue flange as shown in FIG. 8. At a second portion of the tip region 36 between the first portion and the blade tip, a fourth cleat 50d is positioned further away from the glue flange and a foam block 90 is positioned between the glue flange 70 and the fourth cleat 50d. The foam block 90 has a cleat end 91, which engages the ledge surface 55 of the fourth cleat 50d and is retained by the rail of the fourth cleat 50d, and a glue flange end 92 which securely supports an acutely bent portion of the glue flange 70.

Turning back to FIG. 4c, a first adhesive 80 is then applied to the interior surface 28 adjacent to the first edge 25 and above the first cleat 50a of each cleat pair. A plurality of clamp tools 60 of the type described in connection with FIG. 3c is provided and attached to each cleat pair 50a, 50b mounted on the interior surface 28 of the blade shell part 24.

As best seen in FIG. 6a, a first foot 61 of the clamp tool 60 attached to the first cleat 50a via a pin with a head (not shown) inserted through the hole of the first foot 61 and the hole 54 of the anchor 53 of the first cleat 50a from one side and a locking pin attached to the other side of the pin protruding from the first foot 61 to secure the first foot 61 to the first cleat 50a. This operation is repeated in the same way to attach the second foot 62 to the second cleat 50b. Additionally, a first adhesive 80 is applied to the interior surface 28 of the first wind turbine shell part 24 adjacent to the first edge 25.

Turning to FIG. 6b, a glue flange 70 is provided. The glue flange 70 is a pre-cured second composite structure including a second fibre-reinforcement material embedded in a second polymer matrix. The glue flange is separately manufactured relative to the first and second wind turbine blade shell parts 24, 26. The glue flange 70 is rectangularly shaped with its major length dimension in the longitudinal direction L. As mentioned previously, the trailing edge 20 of the blade 10 becomes increasingly acute near the tip region 36 and thus the glue flange 70 increasingly folds along its major length dimension towards the tip 15 as best seen in FIG. 5. The glue flange 70 has an upper edge 71, a lower edge 72, an interior surface 73 configured for facing the interior of the wind turbine blade, and an exterior surface 74 configured for facing the exterior of the wind turbine blade. The lower edge 72 of the glue flange 70 is placed to rest on the ledge surface 55 of each first cleat 50a and leans against the clamp head 64 of each clamp tool 60 in the open position as shown in FIG. 6b.

As shown in FIG. 6c, a second adhesive 81 is applied to a bond surface of the first wind turbine blade shell part 24 adjacent to the first edge 25 and a third adhesive 82 is applied to the glue flange 70 adjacent to the upper edge 71.

Turning now to FIG. 7a, the wind turbine blade shell parts 24, 26 are then closed by turning the second wind turbine blade shell part 26 on top of the first wind turbine blade shell part 24 thereby bringing the first edge 25 and the second edge 27 together and squeezing the second adhesive 81 between a bond surface of the second wind turbine blade shell part 26 and the bond surface of the first wind turbine blade shell part 24.

Moving on to FIG. 7b, each clamp tool is actuated by an operator pulling the actuator 65 thereby rotating the clamp head about the clamping axis so that the glue flange 70 is clamped between each clamp head 64 and the interior surface 28 of the wind turbine blade shell parts 24, 26. The first adhesive 80 is thus squeezed between the glue flange 70 and the interior surface 28 of the first wind turbine blade shell part 24 and the third adhesive 82 is squeezed between the glue flange 70 and the second wind turbine blade shell part 26.

Lastly, as shown in FIG. 7c, the first, second, and third adhesive 80, 81, 82 then harden to integrate the wind turbine blade shell parts 24, 26 to the integrated wind turbine blade shell 13. Any excess second adhesive 81 on the exterior of the wind turbine blade shell parts 24, 26 is removed. The locking pins of the first and second feet of each clamp tool 60 are detached and all clamp tools 60 are removed from the wind turbine blade shell and can be reused for a subsequent blade assembly. The cleats 50a, 50b, 50c are intended to remain inside the wind turbine blade shell 13.

LIST OF REFERENCES 2 wind turbine
4 tower
6 nacelle
8 hub
10 blade
13 shell
14 blade tip
15 tip end
16 blade root
17 root end
18 leading edge
20 trailing edge
24 first blade shell part
25 first edge
26 second blade shell part
27 second edge
28 interior surface
30 root region
32 transition region
34 airfoil region
36 tip region
36a first portion
36b second portion
40 shoulder
50 cleat
50a first cleat
50b second cleat
50c third cleat
50d fourth cleat
51 base
52 base surface
53 anchor 54 hole
55 ledge surface
56 rail
57 rib
58 head
59 head surface
60 clamp tool
60a first arrangement of the clamp tool
60b second arrangement of the clamp tool
60c third arrangement of the clamp tool
60d fourth arrangement of the clamp tool
60e fifth arrangement of the clamp tool
61 first foot
62 second foot
63 arm
64 clamp head
65 actuator
66 first adjustment member
67 second adjustment member
68 third adjustment member
69 stop
70 glue flange
71 upper flange edge
72 lower flange edge
73 interior flange surface
74 exterior flange surface
80 first adhesive
81 second adhesive
82 third adhesive
90 block
91 cleat end
92 flange end
L longitudinal direction
$L_{cleat}$ cleat longitudinal direction
P mirror plane
$T_1$ clamping axis
$T_2$ first adjustment direction
$T_3$ second adjustment direction
$T_4$ adjustment rotational axis
$T_5$ telescopic adjustment direction
$T_6$ clamping direction

The invention claimed is:

1. A method for assembling an integrated wind turbine blade shell, the method comprising the steps of:
   providing:
   a first and a second wind turbine shell part each extending along a longitudinal direction and each having an interior surface configured for facing the interior of the wind turbine blade, the first wind turbine blade shell part comprising a first edge and the second wind turbine blade shell part comprising a second edge,
   a glue flange extending along the longitudinal direction and having an upper edge, a lower edge, an interior surface configured for facing the interior of the wind turbine blade, and an exterior surface configured for facing the exterior of the wind turbine blade,
   a plurality of wind turbine blade cleats each including a base surface, an anchor positioned at a distance from the base surface, a ledge surface extending transversely to the base surface, and a rail protruding from the ledge surface, and
   a plurality of clamp tools each including a clamp head and an actuator configured for actuating the clamp head between an open position and a clamping position;
   attaching the plurality of wind turbine blade cleats including first cleats onto the interior surface of the first wind turbine blade shell part, the first cleats being positioned at a distance from the first edge of the first wind turbine blade part and being distributed along the longitudinal direction, wherein the ledge surface and the rail of each first cleat defines, together with the interior surface of the first wind turbine blade shell part, a ledge for supporting the glue flange;
   securing each clamp tool of the plurality of clamp tools to the anchor of each corresponding cleat of the plurality of attached cleats;
   resting the lower edge of the glue flange on the ledge surface of each first cleat so that the upper edge of the glue flange extends above the first edge of the first wind turbine blade shell part;
   closing the first and second wind turbine blade shell parts by bringing the first edge of the first wind turbine blade shell part and the second edge of the second wind turbine blade shell part together;
   actuate the plurality of clamp tools to clamp the glue flange between the clamp head of each clamp tool and interior surface of the first and second wind turbine blade shell parts so that a first adhesive contacts the exterior surface of the glue flange and the interior surface of the first wind turbine blade shell part and so that a second adhesive contacts the exterior surface of the glue flange and the interior surface of the second wind turbine blade shell part; and
   causing or letting the first adhesive and second adhesive harden to integrate the first wind turbine blade shell and second wind turbine blade shell part via the glue flange so as to assemble the integrated wind turbine blade shell.

2. A method according to claim 1, further comprising attaching second cleats of the plurality of wind turbine blade cleats onto the interior surface of the first wind turbine blade shell part, each second cleat being positioned adjacent to a first cleat to form a cleat pair and wherein each clamp tool is attached to a corresponding cleat pair.

3. A method according to claim 1, wherein the second cleat of each cleat pair is positioned further from the first edge than the respective first cleat.

4. A method according to claim 1, wherein the step of attaching the clamp tool to the corresponding cleat is performed by inserting an end of a detachable pin through a hole of each anchor and securing the pin to each corresponding cleat.

5. A wind turbine blade cleat for assembling a wind turbine blade shell, the wind turbine blade cleat extending along a longitudinal direction configured to be arranged parallel to a longitudinal direction of the wind turbine blade shell, the wind turbine blade cleat comprising:
   a base including a base surface configured for being attached to an interior surface of a wind turbine blade shell,
   an anchor positioned at a distance from the base surface and configured for attaching a clamp tool to the interior surface of the wind turbine blade shell via the attached base surface,
   a ledge surface extending transversely to the base surface, and
   a rail protruding from the ledge surface,
wherein, when the base surface of the wind turbine blade cleat is attached to the interior surface of the wind turbine blade shell, the ledge surface and the rail define a ledge extending along the longitudinal direction, the ledge being able to receive and support a lower edge of a separate, upright glue flange for being attached to the wind turbine blade shell.

6. A wind turbine blade cleat according to claim 5, wherein the anchor comprises a hole extending along the longitudinal direction and being configured for receiving an attachment pin of a clamp tool.

7. A wind turbine blade cleat according to claim 5, comprising one or more ribs separating the anchor from the base.

8. A wind turbine blade cleat according to claim 5, wherein cross-sections of the wind turbine blade cleat along the longitudinal direction are constant.

9. A wind turbine blade comprising a cleat according to claim 5.

10. A wind turbine blade according to claim 9 comprising a first and a second wind turbine blade shell part each having an interior surface facing the interior of the wind turbine blade and each being a first composite structure including a first fibre-reinforcement material embedded in a first polymer matrix, the cleat being attached to the interior surface of the first wind turbine blade shell part.

11. A wind turbine blade according to claim 9 further comprising a glue flange being a second composite structure including a second fibre-reinforcement material embedded in a second polymer matrix, wherein the glue flange is separately manufactured relative to the first and second wind turbine blade shell parts, and wherein the glue flange connects the interior surface of the first wind turbine blade shell part with the interior surface of the second wind turbine blade shell part.

12. A kit of tool parts comprising a wind turbine blade cleat according to claim 5 and a clamp tool.

\* \* \* \* \*